United States Patent
Papaleo

[11] Patent Number: 5,470,235
[45] Date of Patent: Nov. 28, 1995

[54] CHILD BEHAVIOR IMPROVEMENT SYSTEM

[76] Inventor: Stephen Papaleo, 4505 Van Dyke Ave., San Diego, Calif. 92116

[21] Appl. No.: 270,815

[22] Filed: Jul. 5, 1994

[51] Int. Cl.⁶ ......................................... G09B 19/00
[52] U.S. Cl. ........................................ 434/238; 434/258
[58] Field of Search .................................. 434/236, 238, 434/258; 273/273; 446/75, 310

[56] References Cited

U.S. PATENT DOCUMENTS

| | | | |
|---|---|---|---|
| 2,883,765 | 4/1959 | Blaine | 434/238 |
| 3,538,620 | 11/1970 | Kohnen et al. | 446/310 |
| 4,353,701 | 10/1982 | Greenberg | 434/259 |
| 4,609,356 | 9/1986 | Gilden et al. | 434/259 |
| 4,726,799 | 10/1988 | Walsh | 434/238 |
| 4,820,164 | 4/1989 | Kemper | 434/238 |
| 4,952,153 | 8/1990 | McAllister | 434/259 |

*Primary Examiner*—Paul J. Hirsch
*Attorney, Agent, or Firm*—Baker, Maxham, Jester & Meador

[57] ABSTRACT

A child behavior improvement system comprises a support member having a plurality of receptacles for receiving indicia of a reward, multiple discs having indicia defining a reward positioned in each of the receptacles, a over for covering each receptacle, the cover being at least partially removable for providing access to the reward, and selectable indicia for positioning on the cover for identifying a desirable behavior goal.

19 Claims, 1 Drawing Sheet

U.S. Patent  Nov. 28, 1995  5,470,235
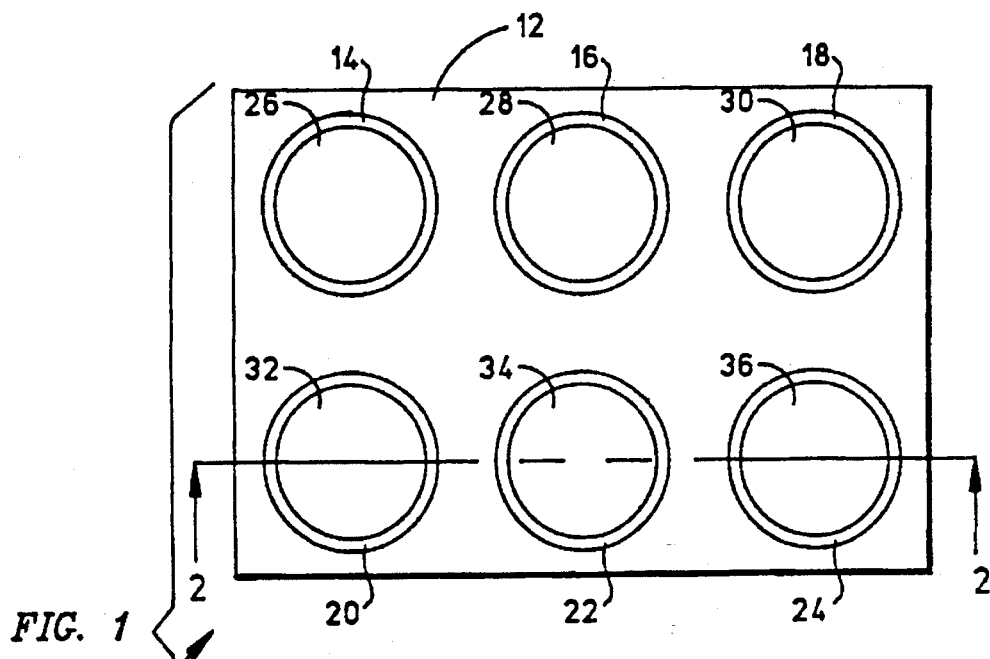
FIG. 1
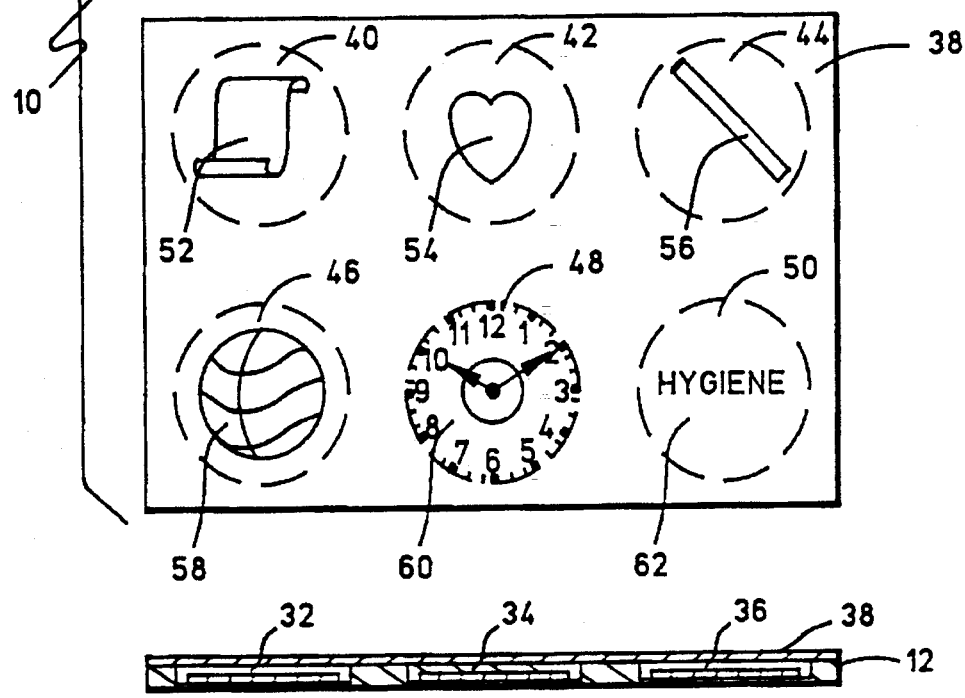
FIG. 2
| DO THIS | WITH THIS | LIKE THIS |
|---------|-----------|-----------|
| DRY | DISHES | BEFORE BED |
| WASH | HANDS | ON TIME |
| TAKE | CHORES | |
| FEED | | |
FIG. 3

CHILD BEHAVIOR IMPROVEMENT SYSTEM

BACKGROUND OF THE INVENTION

The present invention relates to education and training and pertains particularly to method and apparatus for enhancing desirable behavior in subjects.

A healthy functionally sound society is a product of the collective values, beliefs and ethics of its adult citizens. Research in child development and learning theory points to the developing child as the key to behavior as an adult. The developing child looks to the adults in its life for guidance as to values, beliefs, and ethics. Typically the most influential adults are the parents. However, in todays fast paced and fragmented society, it is difficult for parents to know how to effectively pass core values and socially appropriate behaviors to their children. Todays parents are emotionally stressed, physically rushed, and often lacking a structure within which they can effectively deal with the uniqueness of their children's personalities and behavior.

The present invention was devised primarily for giving parents tools for enhancing the development of children in the four to twelve year old range into responsible adults. The effective development of children of this age range into socially responsible and effective individuals is critical to the social and political health and stability of a nation. Motivation and guidance is a major factor in the effective development of desirable behavior traits in a subject in children and young adults. Reward is one of the most effective motivating factors for inducing a mode of behavior.

It is desirable that an effective system be available for enabling parents to interact effectively with a developing child in such a way as to enhance the parent child relationship both emotionally and functionally.

SUMMARY OF THE INVENTION

It is the primary object of the invention to provide an improved behavior enhancement system.

In accordance with a primary aspect of the present invention an improved behavior enhancement system comprises a support member having a plurality of receptacles, means for defining a reward disposed in each of said receptacles, cover means for covering each said receptacle, said cover means having means thereon identifying a desirable behavior, and said cover means being at least partially removable for providing access to said reward.

BRIEF DESCRIPTION OF THE PREFERRED EMBODIMENTS

The above and other objects and advantages of the invention will become apparent from the following description when read in conjunction with the accompanying drawing wherein:

FIG. 1 is a top plan view of an exemplary embodiment of the major components of the invention, partially assembled;

FIG. 2 is a section view taken on line 2—2 of the fully assembled embodiment of FIG. 1; and FIG. 3 is a partial view of another component of the invention.

DETAILED DESCRIPTION OF THE PREFERRED EMBODIMENT

Referring to FIG. 1 of the drawing, an exemplary embodiment of the main component of the present invention is illustrated. The illustrated embodiment designated generally by the numeral 10 comprises a thin, flat generally rectangular holder or support member 12 having a plurality of receptacles 14, 16, 18, 20, 22 and 24, 6 in number as illustrated. The support member may be constructed of any suitable material and may have any number and shape of receptacles without alternating the principles thereof. A suitable holder can be constructed of cardboard with the receptacles formed by cutouts. It may also be constructed of plastic, such as by molding.

The illustrated holder receptacles are designed to hold circular disks 26 through 36, each representing or defining a reward. These disks may represent a reward by having an intrinsic value themselves, or they may represent something of value. For example, cardboard milk bottle caps are now a collector's item among children and teenagers and have intrinsic value. Other items, such as rare coins, jewelry and other similar items may also be used. Discs of cardboard or other material that include words or symbols (e.g. $) that represent other valuable items may also be used.

The present invention was devised to provide a system for utilization, such as by parents, teachers, counselors and others to enhance and encourage certain desirable behavior in the process of development of the child. The present system is designed for children from age 4 to approximately 14, based on learning theory approach.

One embodiment of the invention contemplated utilizes cardboard milk cap disks which serve as reinforcers or rewards due to the popularity they currently enjoy as collectibles by children. These bottle caps are currently a popular collectors item for children. They are available commercially and are presently a popular collectable and play item by children. Other items may also be utilized as will be further explained.

The holder is designed to hold a plurality of these disks in the recesses or receptacles with the receptacles being covered by a cover sheet 38, which may be secured over the top of the holder 12, such as by suitable adhesive on the back of the cover sheet 38. The cover sheet 38 is provided with openable windows corresponding to the receptacles of the holder 12 to overlie the receptacles. These windows embody construction which incorporates a kiss cut or perforation on each separate window allowing it to be separated and folded back when the perforations are broken. This separation and folding back reveals and provides access to the underlying reward.

In a preferred embodiment of the invention the windows are provided with some external indicia of a goal or desirable behavior to be achieved in order to reach or secure the reward. This indicia may be in the form of words or symbols. For example, as illustrated, a symbol 52 in or on window 40 may represent scholastic achievement. In the alternative, or in addition, the window may be provided with selective lettering or words that represent the goal or suggested steps in reaching the goal.

For example, in reference to FIG. 3 a further component of the invention is a parcel 64 containing a series of labels 66, 68 and 70 which are die-cut along horizontal lines 72 and vertical lines 74 to approximately 1"×⅝" on, for example, a 8½"×11" mil clear acetate label stock. These labels contain words or phrases that enable the parent to operationally define either a goal or wide array of desirable behaviors by combining words from different columns and rows. The labels or words may be individually selected and peeled off and placed at appropriate positions on an adjacent or an appropriate window.

Desired behaviors are defined by the parent by first choosing a word (label) under the column labeled "DO THIS" then adding another dimension of behavior utilizing a word (label) from the column labeled "WITH THIS" and further adding an additional dimension with a word (label) from the column labeled "LIKE THIS". This enables the parent to more clearly define a desired pattern of behavior or series of actions toward a defined goal. Additional labels from additional columns may be provided, Table I, adding a time-frame, such as "AT THIS TIME" or "BEFORE A PREDETERMINED TIME", for example. An additional column may provide labels which aid in defining or designating behaviors of the heart which is composed of various social values.

The window 40, thus may represent a desired goal of scholarly achievement with labels added to suggest steps or action to be taken, such as "FINISH HOMEWORK PROMPTLY". The following table, for example, may be referred to as exemplary of labels to be selected and arranged to achieve the desired goals. The table is not to be taken as limiting, as many more labels may be provided within the terms of the invention.

A clock symbol 60 in conjunction with window 48 suggests a desirable characteristic of timeliness. The appropriate terms and labels may be selected and positioned to provide guidance toward the goal. This may require timeliness, such as completing certain chores by a certain time.

In addition to or an alternative to the symbols, a simple word or combination of terms may be simply positioned on the window, such as illustrated at 62, spelling out the desired goal. Again, additional labels may be provided to give guidance as to achieving the particular goal.

The reinforcement delivery system may be pre-manufactured with a number of desirable goals pre-printed and the holder preloaded with predetermined disks or the like representing a reward. However, it is contemplated that a preferred embodiment will be provided in a kit form comprising the major components as previously described, enabling the parent or counselor to custom construct a system for each child. The holders may be constructed to have any number of cavities to represent any number of desired goals. In addition, any number of the holder units with any number of goals may be provided for each subject. The system enables any number of goals to be identified and

TABLE 1

| DO THIS | WITH THIS | LIKE THIS | DO THIS | WITH THIS | AT THIS TIME | BEHAVIORS OF THE HEART |
| --- | --- | --- | --- | --- | --- | --- |
| Dry | Dishes | Before Bed | Closes | Cabinets | 7:00 | Graciousness |
| Wash | Hands | On Time | Calls | Home | 7:30 | Generosity |
| Take | Chores | After Dinner | Helps | Dad | 8:00 | Gentleness |
| Open | House | After School | Pick-Up | Floor | 8:30 | Thoughtfulness |
| Clean | Room | Before School | Says Please To | Mom | 9:00 | Kindness |
| Walk | Dog | 1 Month | Sweep | Garage | 9:30 | Truthfulness |
| Brush | Teeth | On Time | Polite To | Consideration | 10:00 | Tolerance |
| Finish | Homework | Promptly | Dresses | Home | 10:30 | Respect |
| Bring | Clothes | Regularly | Speaks in | Normal Voice | 11:00 | Sensitivity |
| Take Out | Trash | First Thing | Turn in | Poop | 12:00 | Consideration |
| Leave | Kitchen | Quickly | Bring | Feelings Good | 12:30 | Honesty |
| Attend | Windows | Daily | Speak Quietly | To Sister | 1:00 | Integrity |
| Remember | Hygiene | For 1 Day | Says Thank You | To Others | 1:30 | Faith |
| Turn Off | Lights | For 2 Days | Take | Medication | 2:00 | Wisdom |
| Assist | Living Room | For 3 Days | Comb | Hair | 2:30 | Courage |
| Close | Drawers | For 4 Days | Does | Toilet | 3:00 | Appreciation |
| Fold | Laundry | For 5 Days | Prepares for | Dinner | 3:30 | Understanding |

A window 42 may have a heart symbol 54 representing behaviors of the heart, or achievement of desired social goals or behavior. Again, the parent or supervising adult may select and add appropriate descriptive labels setting forth the desired steps or goals. This enables a continuous pattern of actions to be outlined by the parent to be followed by the child.

A universal "NO" symbol 50 as illustrated in conjunction with window 44 may represent a desired change in "negative" behavior. For example, the steps of achieving the goal may require refraining from doing certain detrimental actions or behavior, such as not smoking, not playing hookey, or not initiating fights. Once again, this behavior may be further guided by the appropriate selection and positioning of labels in conjunction with the symbol.

The basketball symbol of 58 imposed on window 46 may represent a goal of athletic achievement. Similarly, guidance may be provided by the appropriate selection and positioning of words or terms suggestive of the desired action and activity to reach the respective goal. Once the goal is achieved, the window may be opened and the reward retrieved. The retrieval of the reward serves to enforce and enhance the desirable behavior patterns used to gain the reward.

progress towards the goals be made in parallel or serially. The system rewards and reinforces continuous desired actions and behavior.

The system also enables the child to participate in helping to define goals and desirable steps toward reaching the selected or defined goal. It also encourages initiative on the part of the child and encourages the development of this trait, as well as independence and constructive thinking.

In addition to the examples mentioned, alternate modes of representing a reward may also be provided. These may be in the form of custom disks which represent something other than the intrinsic value of the disk itself. For example, the disks themselves may be provided with wording which may represent certain rewards, such as a certain amount of money, a trip to Disneyland, a movie, a summer vacation at a certain location etc. This system allows a parent or guiding adult to customize a system of rewards with appropriate steps for achieving the goal.

The system is designed to provide parents with a framework that will enable them to maintain greater awareness of the parent-child relationship in both global and behavior-specific ways. It assists in the communication process and gives parents structured ways to interact with their children in healthier ways. It sets the stage for emotional warmth, maintaining and increasing self-esteem, motivation, accomplishment, and development of healthy values.

While I have illustrated and described my invention by means of specific embodiments, it is to be understood that numerous changes and modifications may be made therein without departing from the spirit and scope of the invention as defined in the appended claims.

I claim:

1. A behavior enhancement system comprising:

a support member having a plurality of receptacles;

means for defining a reward disposed in each of said receptacles;

cover means for covering each said receptacle, said cover means having means thereon identifying a desirable behavior, and said cover means being at least partially removable for providing access to said reward means.

2. A behavior enhancement system according to claim 1 wherein said support member is a generally flat rectangular panel having circular recesses defining said receptacles.

3. A behavior enhancement system according to claim 2 wherein said means defining a reward is a circular disc having a reward identified thereon.

4. A behavior enhancement system according to claim 2 wherein said means defining a reward is a disc having intrinsic value.

5. A behavior enhancement system according to claim 2 wherein said means identifying a desirable behavior is a graphic symbol selectively assembled in association with a selected reward.

6. A behavior enhancement system according to claim 1 wherein said means identifying a desirable behavior is one or more descriptive words on peel off labels for selectively assembling in association with a selected reward.

7. A behavior enhancement system according to claim 6 wherein said means defining a reward is a circular disc having a reward identified thereon.

8. A behavior enhancement system according to claim 6 wherein said means defining a reward is a disc having intrinsic value.

9. A behavior enhancement system according to claim 2 wherein said means identifying a desirable behavior is one or more descriptive words on peel off labels for selectively assembling in association with a selected reward.

10. A kit defining a behavior enhancement system comprising:

a generally thin flat holder having a plurality of receptacles for receiving means for defining a reward;

multiple selectable reward means for positioning in each of said receptacles;

cover means for covering each said receptacle, said cover means being at least partially removable for providing access to said reward means; and selectable means for positioning on said cover means for identifying a desirable behavior goal.

11. A behavior enhancement system according to claim 10 wherein said reward is a circular disc having a reward identified thereon.

12. A behavior enhancement system according to claim 10 wherein said reward is a circular disc having intrinsic value.

13. A behavior enhancement system according to claim 11 wherein said means identifying a desirable behavior goal is a graphic symbol.

14. A behavior enhancement system according to claim 11 wherein said means identifying a desirable behavior goal is one or more descriptive words.

15. A method for enhancing desired behavior in a subject, comprising the steps of:

providing a support member having a plurality of receptacles for receiving means for defining a reward;

providing multiple means for defining a reward for positioning in each of said receptacles;

providing cover means for covering each said receptacle, said cover means being at least partially removable for providing access to said reward; and providing selectable means for positioning on said cover means for identifying a desirable behavior goal.

16. A method according to claim 15 wherein said support member is a thin flat generally rectangular panel having circular recesses defining said receptacles.

17. A behavior enhancement system according to claim 16 wherein said reward means is a circular disc having a reward identified thereon.

18. A behavior enhancement system according to claim 17 wherein said means identifying a desirable behavior goal is a graphic symbol.

19. A behavior enhancement system according to claim 17 wherein said means identifying a desirable behavior goal is one or more descriptive words.

* * * * *